United States Patent [19]

Corcoran et al.

[11] Patent Number: 4,556,693

[45] Date of Patent: Dec. 3, 1985

[54] ADDITIVE FOR IMPROVING WEATHERING RESISTANCE AND DECREASING VISCOSITY OF HIGH SOLIDS COATINGS

[75] Inventors: Richard J. Corcoran, Somerville; Peter W. Kopf, Hillsborough; Donald F. Smith, Jr., Bridgewater, all of N.J.

[73] Assignee: Union Carbide Corporation, Danbury, Conn.

[21] Appl. No.: 637,473

[22] Filed: Aug. 3, 1984

[51] Int. Cl.$^4$ .................. C08L 61/28; C08L 67/04
[52] U.S. Cl. .................... 525/162; 428/460; 428/463; 525/303; 525/308; 525/384; 525/386
[58] Field of Search .............. 525/303, 386, 162, 308, 525/384

[56] References Cited

U.S. PATENT DOCUMENTS

| | | | |
|---|---|---|---|
| 3,896,303 | 7/1975 | Gerkin et al. | 260/78.3 R |
| 4,220,575 | 9/1980 | Wallace | 260/29.3 |
| 4,226,753 | 10/1980 | Lewis et al. | 260/29.6 |
| 4,416,917 | 11/1983 | France et al. | 427/302 |

*Primary Examiner*—Theodore E. Pertilla
*Attorney, Agent, or Firm*—Jean B. Mauro

[57] ABSTRACT

The total solids and viscosity of high solids coating compositions containing hydroxyl functional acrylic copolymer base resins are decreased by incorporating up to about 30% by weight of a mixture of reactive diluents. The reactive diluents are a mixture of a reactive acrylic oligomer and a polycaprolactone hexol.

14 Claims, No Drawings

ADDITIVE FOR IMPROVING WEATHERING RESISTANCE AND DECREASING VISCOSITY OF HIGH SOLIDS COATINGS

BACKGROUND OF THE INVENTION

This invention pertains to high solids coatings and in particular to their modification with low molecular weight hydroxy functional binary reactive diluents.

BACKGROUND ART

Increasing governmental environmental regulations have required that automotive and industrial coatings have reduced solvent emissions. This requires that higher solids coatings be developed. Simple reduction of solvent in paint formulations is not the preferred method of obtaining higher solids because viscosity is increased. An alternative approach is to replace solvents with a reactive diluent, that is, a low viscosity additive with reactive functionality which is incorporated into the final cured product by cross-linking. This diluent reduces the viscosity of the formulated paint and yet reacts with the crosslinker to become part of the final coating. A drawback to this approach in the current art is that both appearance, e.g., gloss, and distinctness of image, as well as long term weathering properties are degraded. Automotive manufacturers need a system which will allow them to increase solids, if only by a few percent, while retaining performance and appearance.

Other effortst have been made in the past to discover suitable reactive diluents for high solids coating compositions. However such efforts have generally failed due mainly to the fact that the prospective reactive diluents in high solids coating compositions may exhibit too high a volatility and also deterioration of coating properties may result from use of these reactive diluents in high solids coatings systems.

DISCLOSURE OF THE INVENTION

Improved high solids coating compositions, containing an hydroxy functional acrylic copolymer base resin having higher total solids contents and when cured, exhibit enhanced weathering resistance and hardness have now been found where the improvement comprises replacing part of the hydroxy functional acrylic copolymer base resin with a binary reactive diluent comprising:

(1) A reactive acrylic oligomer having the formula $X_aY_b$ wherein X is an hydroxyalkyl acrylate or methacrylate, Y is an alkyl acrylate or methacrylate, each of the alkyl groups having 1 to about 6 carbon atoms and each of "a" and "b" having values of about 4 to about 14; and (2) A polycaprolactone hexol, wherein the weight ratio of oligomer (1) to the polycaprolactone hexol (2) is in range of about 1:1 to about 4:1, preferably, about 1.5:1 to about 2.5:1, and the weight ratio of reactive acrylic oligomer plus polycaprolactone hexol to acrylic copolymer base resin is in the range of about 1:1 to about 1:9. Preferably, the combined weight of oligomer (1) less polycaprolactone hexol to acrylic base resin is in the range of about 40:60 to about 20:80.

The high solids coatings compositions of this invention can optionally contain an organic solvent and a catalyst for activating the crosslinking system. The crosslinking of these high solids coating compositions is usually effected by the use of an alkylolated melamine and these are preferred in the compositions of this invention.

The high solids coatings compositions are applied in a conventional manner and thermally cured to dried films. The cured coating films are useful as automotive finishes, appliance finishes, business machines finishes, coil coatings, house sidings, general metal finishing, and the like.

DETAILED DESCRIPTION

The hydroxy functional acrylic copolymer base resins utilized in the high solids coating compositions of this invention are well known to those skilled in the art and are commercially available from several sources. These hydroxy functional acrylic copolymer base resins can contain monoethylenically unsaturated monomers having hydroxy functionality and also other monoethylenically unsaturated monomers, and can be prepared by conventional polymerization techniques in which the monoethylenically unsaturated monomers are blended with solvents and polymerization catalysts and heated to about 100° to about 200° C. for about 2 to about 6 hours. Solvents which can be used in these conventional polymerization techniques are well known in the art and include, for example, methyl n-amyl ketone, n-butyl alcohol, methyl ethyl ketone, and the like. Such solvents can also be used as a diluent in the high solids coating compositions themselves, preferably in a concentration below about 30 wt. percent of the total coating composition weight so as to retain the high solids nature of the coating. Suitable polymerization catalysts include azo-bisisobutyronitrile, and other azo catalysts as well as aliphatic or aromatic peroxides, such as capryloyl oxide, lauryl peroxide, benzoyl peroxide, and the like.

Suitable monoethylenically unsaturated monomers having hydroxyl functionality which can be employed in the preparation of the hydroxyl functional acrylic polymers include among others the following esters of acrylic or methacrylic acid and aliphatic dihydric alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 2-hydroxyethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; 7-hydroxyheptyl methacrylate; and the like. The preferred monoethylenically unsaturated monomers having hydroxyl functionality include hydroxyethyl acrylate, hydroxypropyl acrylate, hydroxyethyl methacrylate, hydroxypropyl methacrylate and hydroxybutyl methacrylate. The hydroxy functional acrylic polymers can contain from about 5 to about 40 weight percent, preferably from about 10 to about 20 weight percent, of the monoethylenically unsaturated monomers having hydroxy functionality.

The remainder of the monomers which can be employed in the preparation of the hydroxyl functional acrylic polymers include one or more other monoethylenically unsaturated monomers such as the esters of acrylic or methacrylic acid and monohydric alcohols, alpha, beta ethylenically unsaturated carboxylic acids and vinyl substituted hydrocarbons. The hydroxyl functional acrylic polymers can contain from about 95 to about 60 weight percent, preferably from about 90 to about 80 weight percent of these other monoethylenically unsaturated monomers. Suitable esters of acrylic or methacrylic acid and monohydric alcohols include among others ethyl acrylate, butyl acrylate, isobutyl acrylate, 2-ethylhexyl acrylate, hexyl acrylate, methyl methacrylate, ethyl methacrylate, propyl methacrylate, isopropyl methacrylate, butyl methacrylate, isobutyl methacrylate, lauryl methacrylate and the like. The preferred esters are ethyl acrylate and butyl acrylate. The esters of acrylic or methacrylic acid and monohydric alcohols can be present in the hydroxyl functional acrylic polymers in an amount of from about 95 to about 10 weight percent depending upon the particular application of the high solids coating composition. Suitable alpha, beta ethylenically unsaturated carboxylic acids include among others acrylic acid, methacrylic acid, itatonic acid, crotonic acid and the like. Preferred are acrylic acid and methacrylic acid. The alpha, beta ethylenically unsaturated carboxylic acids can be present in an amount of from about 0 to about 5 weight percent of the total polymer. Suitable vinyl hydrocarbons include, for example, styrene, alpha methylstyrene, vinyl toluene, t-butylstyrene, chlorostyrene and the like. The preferred vinyl hydrocarbon is styrene. When vinyl hydrocarbons are employed in the preparation of the hydroxy functional acrylic polymers, they should constitute less than 50 weight percent of the total polymer. Other monomers such as vinyl acetate, acrylonitrile, vinyl chloride, methacrylonitrile and the like can be copolymerized in the hydroxy functional acrylic polymers in an amount of from about 0 to about 50 weight percent of the total polymer.

The hydroxy functional acrylic polymers can have a number average molecular weight of from about 1,000 to about 30,000, preferably from about 2,000 to about 15,000. The most preferred hydroxy functional acrylic polymers have a number average molecular weight of from 3,000 to 10,000. The hydroxy number of the hydroxyl functional acrylic polymers can be from about 24 to about 145, preferably from about 48 to about 96. A typical hydroxy functional acrylic polymer contains from about 5 to about 40 weight percent of a monoethylenically unsaturated monomer having hydroxy functionality and from about 95 to about 60 weight percent of other monoethylenically unsaturated monomers. A typical hydroxy functional acrylic polymer suitable for use in the present invention contains from 10 to 20 weight percent of hydroxyethyl acrylate, from 1 to 5 weight percent of acrylic or methacrylic acid, from 10 to 45 weight percent of butyl acrylate and from 10 to 45 weight percent of styrene as illustrated in the following reaction equation:

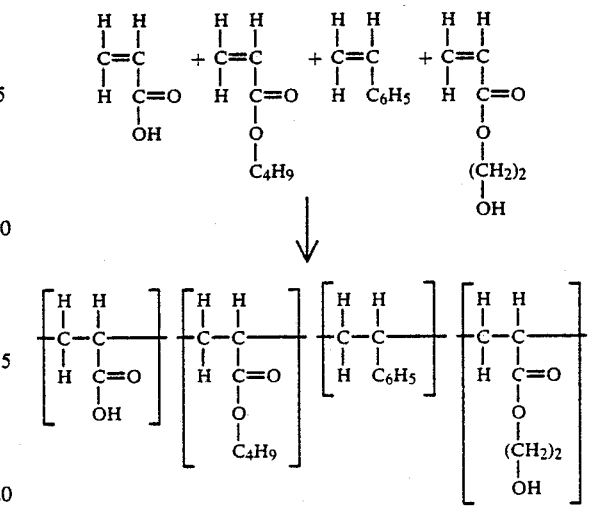

The pendant hydroxyl groups are the reacting sites for cross-linking with a suitable amino resin such as, alkylolated melamine. Of course, the quantities and types of reactive monoethylenically unsaturated monomers can be varied to provide a broad range of hardness and flexibility properties in the finished coating.

The concentration of the hydroxy functional acrylic polymer in the high solids coating compositions of this invention can be from about 5 to about 40 weight percent, preferably from about 10 to about 20 weight percent, and most preferably from about 15 to about 20 weight percent of the total weight of the high solids coating composition. As further described herein, the particular concentration of the hydroxy functional acrylic polymer together with the alkylolated melamine and reactive binary diluents provides for a ratio of the equivalent weight of the alkylolated melamine to the total hydroxyl equivalent weight of the hydroxy functional acrylic polymer and the reactive binary diluents ranging from about 0.8 to about 2.5, preferably from about 1.0 to about 1.8, as well as 1.0 to 1.5 and most preferably from about 1.3 to about 1.5.

The high solids coating compositions of this invention may contain an alkylolated melamine. These compounds are well known and many are available commercially. Those suitable for use can be represented by the general formula:

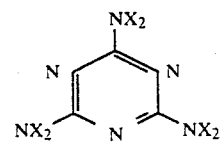

wherein X is hydrogen, hydroxyalkyl or alkoxyalkyl in any combination having from 1 to about 12 carbon atoms and provided at least two of the X substituents are alkoxyalkyl groups. The alkylolated melamines suitable for use in the high solids coating compositions of the present invention preferably contain a predominate amount of hexaalkoxyalkylmelamine. The preferred alkylolated melamines are the highly methylolated melamines as well as mixed methyolated butylolated melamines, with hexamethoxymethylmelamine most preferred. Butylolated melamines can also be used in the high solids coating compositions of this invention.

Other amino resins that can be used include the urea and benzoguanamine resins.

The concentration of the alkylolated melamine in the high solids coating compositions of this invention can be from about 10 to about 50 weight percent, preferably from about 20 to about 40 weight percent, and most preferably from about 25 to about 35 weight percent of the total weight of the high solids composition. The particular concentration of alkylolated melamine together with the hydroxy functional acrylic polymer and the reactive binary diluent provides for a ratio of the equivalent weight of the alkylolated melamine to the total hydroxyl equivalent weight of the hydroxy functional acrylic polymer and the reactive binary diluent ranging from about 0.8 to about 2.5, preferably from about 1.0 to about 1.8, and most preferably from about 1.3 to about 1.5. If the alkylolated melamine concentration is too low and the equivalent ratio falls below about 0.8, the finished coatings become very soft, i.e., poor hardness, and exhibit poor solvent and water resistance. If the alkylolated melamine concentration is too high and the equivalent ratio rises above about 2.5, the finished coatings become very brittle due to the increased cross-linking within the coating compositions.

Polycaprolactone hexols suitable for use as reactive diluents in the present invention can be prepared by the catalytic polymerization of an excess of polycaprolactone triols and a cycloaliphatic epoxide. Many of these polycaprolactone polyols are commercially available from Union Carbide Corporation. Cycloaliphatic epoxides suitable for use in preparing the polycaprolactone hexols include 3,4-epoxycyclohexylmethyl-3,4-epoxycyclohexane carbonylate, bis(3,4-epoxycyclohexylmethyl)adipate, vinyl cyclohexane dioxide and the like. Many of these cycloaliphatic epoxides are commercially available from Union Carbide Corporation. A suitable polymerization catalyst is diethylammonium triflate which is commercially available from the 3M Company as FC-520. This is a salt of diethylamine and trifluoromethanesulfonic acid.

A preferred method for preparation of the polycaprolactone hexols comprises adding one or more polycaprolactone triols to a reactor, heating the polycaprolactone triols to a temperature of about 100° C. and adding the catalyst using a nitrogen sparge as soon as the polycaprolactone triols are molten. The polycaprolactone triols and catalyst mixture is then heated to a temperature of from about 150° C. to about 200° C. and a cycloaliphatic epoxide is added to the mixture. The reaction is carried out for about one hour to about three hours or until the oxirane content has been reduced to almost a nil value. A modification of this process can involve initially adding all of the ingredients into the reactor. A further modification of this method can involve a vacuum treatment of from 10 to 30 minutes after the catalyst addition and/or the use of a vacuum during the heating of the polycaprolactone triols to a molten state. The above process is especially preferred for the preparation of Polyol I utilized in the working examples hereinafter. Preferred polycaprolactone hexols suitable for use as reactive diluents in the present invention have an average molecular weight of from about 600 to about 1500.

In some instances an acid catalyst might be desired to improve the efficiency of the melamine crosslinking reaction during curing. The concentration of the catalyst can vary from zero to about 10 weight percent based on the total weight of the coating composition.

The particular catalyst used and its concentration are dependent to a degree upon its catalytic activity and the specific components present in the coating composition. These catalysts are known to those skilled in the art and include hydrochloric acid, sulfuric acid, p-toluene sulfonic acid, methane sulfonic acid, dodecylbenzene sulfonic acid, phosphoric acid and its alkyl derivatives, maleic acid, trimellitic acid, phthalic acid, succinic acid, naphthalene sulfonic acid, naphthalene disulfonic acid, and their alkyl derivatives especially where the alkyl substituent contains between 6–15 carbons and the like.

The high solids coating compositions can also contain pigments, fillers, and other additives conventionally present in coating compositions in their conventional quantities. The particular ones selected are of no consequence to the basic invention. In preparing the high solids coating compositions, the ingredients are mixed by the conventional procedures used in the production of paints, inks or coating compositions. These procedures are so well known to those skilled in the art that they do not require further discussion here.

The high solids coating compositions are applied to a surface or substrate by conventional means and then thermally cured by heating at a temperature of about 100° C. to 375° C. preferably from 150° C. to 200° C. and more preferably between 120° C. to 180° C. for a period of time sufficient to obtain a dry film. Generally, this time will range from about one minute to several hours, preferably from one minute to 2 hours and more preferentially from about 15 minutes to 1 hour. The components present in a particular high solids coating composition will determine the temperature and time that will be required to obtain an adequate cure and a good film coating.

The coating compositions of this invention are high solids coating compositions and they can contain as much as 90 weight percent or more solids therein. Generally the total solids content of the coatings compositions of this invention range from about 25 to 90 weight percent, preferably from about 50 to 90 weight percent, of the total weight of the coating composition.

PREPARATION OF REACTIVE ACRYLIC OLIGOMERS

The reactive acrylic oligomers having the formula $X_aY_b$ are best prepared by the anionic copolymerization of acrylic esters where one of the co-monomers is an hydroxyalkyl ester of acrylic ester and preferably 2-hydroxyethyl acrylate. In this method a suitable anionic initiator such as an alkali metal alkoxide, more specifically, potassium t-butoxide, is dissolved in a solvent such as tetrahydrofuran. The solution of initiator is then treated with a mixture of acrylate ester monomers, usually in a solvent. Since the anionic polymerization is usually exothermic, it has been found advantageous to use cold water to externally cool the reaction and maintain the temperature at approximately 15°–20° C. After all of the monomers have been added and allowed to react for a sufficient period of time, usually 1 hour, an acid is added to quench any residual initiator, the polymer chain ends and any other basic materials. The resulting salts are filtered and the solvent is removed under vacuum to yield a low molecular weight oligomer, i.e., an oligomer. If desired very low molecular weight materials (monomers or dimers) that were not removed by vacuum stripping can be removed by extracting the product with a solvent that dissolves these low molecular weight materials but not the oligomer.

Such solvents include pentane, hexane, cyclohexane, and the like.

Although 15°-25° C. is the recommended temperature for the preparation of these reactive oligomer diluents, temperatures above and below this can be used. However, the use of lower temperatures slows the reaction rate and therefore lengthens reaction time and these lower temperatures would be more difficult to use in large scale production. Higher temperatures give a faster reaction rate but have the severe disadvantage of producing a reactive diluent with much higher color. Material prepared at 15°-25° C. has a light yellow color, whereas material prepared at 40°-50° C. has a dark yellow almost orange color. Higher temperatures than 45° C. have resulted in higher viscosities (i.e. higher molecular weight) which is also undesirable.

Representative hydroxyalkyl esters of acrylic or methacrylic acid which can be used for making the reactive diluent oligomers of this invention include:
2-hydroxyethyl acrylate
2-hydroxyethyl methacrylate
3-hydroxypropyl acrylate
3-hydroxypropyl methacrylate
4-hydroxybutyl acrylate
4-hydroxybutyl methacrylate
2-hydroxy-1-methylethyl acrylate
2-hydroxy-1-methylethyl methacrylate,
and the like.

Suitable acrylic or methacrylic alkyl esters representing the Y moiety of the reactive diluent oligomers of this invention include:
methyl acrylate
methyl methacrylate
ethyl acrylate
ethyl methacrylate
n-propyl acrylate
n-propyl methacrylate
isopropyl-acrylate
isopropyl-methacrylate
n-butyl acrylate
n-butyl methacrylate
n-pentyl acrylate
n-pentyl methacrylate
n-hexyl acrylate
n-hexyl methacrylate
isohexyl acrylate
isohexyl methacrylate
and the like.

Suitable anionic polymerization initiators include alkali metal alkoxides such as, potassium, sodium, or lithium methoxide, ethoxide, propoxide, isopropoxide, butoxide, and the like. The preferred initiator is potassium t-butoxide.

The polymerization reaction can be quenched by organic acids, such as, acetic, propionic acid, and the like. Any acidic neutralizing agent, however, can be used.

While not essential, it is preferred to conduct polymerization in an inert organic solvent or solvent mixture. Useful solvents include aromatic hydrocarbons, as for example, benzene, toluene, xylene, and the like; aliphatic ethers such as diethyl ether, tetrahydrofuran, and the like.

The number average molecular weight of the hydroxy-containing reactive diluent oligomers is in the range of about 500 to 1000.

The ratio of the moieties represented by X in the formula supra and the moieties represented by the letter Y supra indicated by a and b which can vary from about 4 to about 10 X's and from about 6 to about 14 Y's.

The invention is further described in the examples which follow. All parts and percentages are by weight unless otherwise specified.

The coatings described in these examples use the acrylic AT-400 as the hydroxy functional acrylic copolymer base resin. The reactive acrylic oligomers used were generally hydroxyethyl acrylate/ethyl acrylate copolymers prepared as described above having 4, 5 and 7 parts of hydroxyethyl acrylate to 6, 10 and 14 parts of ethyl acrylate respectively. The polycaprolactone hexol was Polyol I, a 2:1 adduct of the polycaprolactone triol PCP-0301 and 3,4-epoxycyclohexyl methyl-3,4-epoxycyclohexane carboxylate. The description of these materials is given in more detail in the section following giving a list of the materials used. It was customary to use a 2:1 mixture based on solids weight of the reactive acrylic oligomer to the polycaprolactone hexol. These materials were used as reactive diluents and mixed with AT-400 so that the solids weight ratio was: 70:20:10::AT-400:reactive acrylic oligomer:Polyol I. Thus, the reactive diluents were used to replace 30% by weight of the base resin AT-400.

Typical formulations containing Polyol I and either Reactive Oligomer I or Reactive Oligomer II are given in Table VII. The approach taken to make up a formulation was to determine the total number of equivalents of reactive hydroxyl groups present in AT-400 the reactive acrylic oligomer and Polyol I. This was used to calculate the amount of hexamethoxymethyl melamine necessary to crosslink all of the resin (1.36 equivalents of hexamethoxymethyl melamine as Cymel 303 per equivalent of OH). The amount of titanium dioxide necessary to give a pigment:binder ratio of 45:55 was next calculated (binder equals AT-400 plus reactive acrylic oligomer plus Polyol I plus Cymel 303 solids). The weight solids of the sand grind was adjusted with solvent to about 78 wt.% to give acceptable shear, and the grind was done to Hegman No. 7 or better.

The spray solids level could be adjusted between 70 and 77.5 wt. % by changing the amount of 85:15 methylamyl ketone (MAK):CELLOSOLVE Acetate used in the let down. Although Nacure 2500X was used as the crosslinking catalyst, other crosslinking catalysts were also used in the practice of this invention. Since Nacure 2500X is an amine-blocked toluene sulfonic acid, it was used as a 2 wt. % level of the total binder solids. Unblocked acid catalysts such as Cycat 500 and Nacure 155 were used at levels of 1 wt. % of the total binder solids.

Experiments which used reactive oligomers without Polyol I followed the same general procedure. The ratio of components in this case was AT-400:reactive oligomer 70:30 on a solids basis.

A control formulation of AT-400 and Cymel 303 at 65 wt. % solids used for comparison to paints containing binary diluents is given in Table I. The formulation presented therein was used also in the evaluation of the Nacure line of catalysts (King Industries).

All coatings were sprayed with an air gun by common techniques to approximately 2.1-2.4 mil dry thickness. Baking for 30 minutes was done at either 250° or 300° F. after a 30 minute flash.

The coating compositions prepared in the examples below were evaluated according to the following procedures:

Hegman Scale:

The fineness of dispersion of the pigment in the paint vehicle was determined as outlined in ASTM D1210-79. Dispersions were done to a Hegman rating of 7 or better as defined therein.

Ford #4 Cup Viscosity:

The viscosity of the formulated paints was measured by the time necessary for a standard volume of paint to drain through a standard orifice as defined in ASTM D1200-70.

Brookfield Viscosity:

The Brookfield viscosity in centipoise (cps) was measured with a Brookfield Viscometer Model LVT with Spindle #2 at 30 revolutions per minute at 23° C.

Weight % Solids:

The weight % solids in the described formulations was determined by baking a one gram sample of the uncured paint at 110° C. for 1 hour as described in ASTM D2369-81. Reported values are the average of two determinations.

Gloss:

The gloss of cured coatings was determined at two angles of incidence of light, 60° and 20°, as outlined in ASTM D523-80. Gloss readings were taken on 2-3 separate panels coated with identical paints and averaged for reporting.

Distinctness of Image (DOI):

The DOI is a measure of the quality of a reflected image on a surface. The DOI of the cured coatings was measured by visual comparison of known standards to experimental coatings using a Gardco ® Distinctness of Image Meter (Paul N. Gardner Company). The closer the DOI rating is to 100, the better the quality of the coating. Duplicate measurements were made for all samples.

Pencil Hardness:

Pencil leads of increasing hardness values were forced against the film coating surface in a precisely defined manner as described in ASTM-D-3363-74 until one pencil lead marred the surface of the film coating. The surface hardness was considered as the hardest pencil grade which just failed to mar the film coating surface. The pencil leads in order of softest to hardest were reported as follows: 6B, 5B, 4B, 3B, 2B, B, HB, F, H, 2H, 3H, 4H, 5H, 6H, 7H, 8H, and 9H.

Forward Impact Resistance (Gardner Impact):

A measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the coated side of the coated steel panel. The inches times pounds, designated inch-pounds, absorbed by the film without rupturing was recorded as the films forward impact resistance.

Reverse Impact Resistance (Gardner Impact):

A measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the uncoated side of the coated steel panel. The inches times pounds, designated inch-pounds, absorbed by the film without rupturing was recorded as the film's reverse impact resistance.

Solvent Resistance:

A measure of the resistance of the cured film to attack by methylethyl ketone (MEK) and was reported as the number of rubs or cycles of methylethyl ketone soaked cheesecloth required to remove the cured film from the test area. The test was performed by stroking the cured film with a methylethyl ketone soaked cheesecloth until the coating was removed or a maximum of 200 rubs had been performed.

Cleveland Humidity:

Coated metal panels are exposed to 100% relative humidity at 140° F. for 24 hours in a Cleveland Condensing Humidity Cabinet, Model QCT (Q-Panel Company, Cleveland, Ohio). The test procedure followed is that of ASTM D2247-68 except that the air temperature was 140° F. and not 100° F. as described therein. After exposure the panels were rated on the bases of the number and size of any blisters which have formed. The rating scale for size is none-no blisters, 10-very small, 8-small, 6-medium, 2-very large. The rating scale for the number of blisters in F-few, M-medium, D-dense. A good rating is 8F or better. The scale is based on Panel Rating Standards available from the Steel Structure Painting Council, Pittsburgh, Pa.

XW Accelerated Weathering:

Coated metal panels are exposed to light from a carbon arc for 20–22 hours/day for a total of 1000 hours of exposure. At 2 hour intervals distilled water is sprayed on the panels for a period for 18 minutes. The ambient temperature is maintained at 145° F. throughout the test. Tests were performed in a Weather-Ometer Model XW (Atlas Electric Devices Co., Chicago, Ill.). The 60° and 20° specular gloss (ASTM D523-80) is measured initially and at 250 hour intervals. The results shown in the TABLES are reported as initial gloss/gloss after 1000 hours XW. The percentage is shown in parentheses.

The following materials were used in the illustration of this invention:

Cymel ®303—A methylolated melamine commercially available from American Cyanamid Co, viz., hexamethoxymethyl melamine.

Polyol I—A polycaprolactone hexol prepared by adding 2775 grams of a polycaprolactone triol having a number average molecular weight 300, an average hydroxyl number of 560 (commercially available from Union Carbide Corporation as PCP-0301), 1014 grams 3,4-epoxycyclohexylmethyl-3-4-epoxycyclohexane carboxylate (commercially available from Union Carbide Corporation as ERL-4221) and 1.89 grams of dimethyl ammonium triflate catalyst (commercially available from 3M Company) to a reaction flask and heating to 180° C. under a nitrogen blanket for 2 hours. The resulting polycaprolactone hexol product had an average molecular weight of 800 and a hydroxyl number of 312.

Reactive Oligomer I—Prepared by the method shown on page 13 using 1 mole of t-butoxide, 5 moles of hydroxyethyl acrylate and 10 moles of ethyl acrylate. The hydroxy number was 46±2, and the weight average MW 2800.

Reactive Oligomer II—Prepared by the method shown on page 13 using 1 mole of t-butoxide, 7 moles of hydroxyethyl acrylate and 14 moles of ethyl acrylate. The weight average molecular weight was 3060, and the hydroxy number was 28±4.

Acryloiad ® AT-400—A copolymer of butyl acrylate, styrene, hydroxyethyl acrylate and acrylic or methacrylic acid, copolymerized in a weight ratio of 45:36:14:5 respectively, having a number average molecular weight of 2000, a weight average molecular weight of 17000, an acid number of 28 and an OH number of 86.

Cycat®500—dinonylnaphthalene disulfonic acid (American Cyanamid)

Cycat®4040—p-toluene sulfonic acid (American Cyanamid)

Nacure®155—dinonylnaphthalene disulfonic acid (King Industries)

Nacure®1051—dinonylnaphthalene sulfonic acid (King Industries)

Nacure® X49-110—dinonylnaphthalene disulfonic acid (amine blocked)

Nacure®2500X—p-toluenesulfonic acid (amine blocked)

Nacure®3525—dinonylnaphthalene sulfonic acid (amine blocked)

Nacure®5225—dodecylbenzene sulfonic acid (amine blocked)

EXAMPLE I

Control A

A control formulation of AT-400 and Cymel 303 at 65% solids used for comparison to paints containing binary diluents is given in Table I. Several control experiments were performed using the formulation given in Table I in which the type of catalyst was varied. The effect of the catalyst choice on initial 60° and 20° gloss, distinctness of image, pencil hardness and forward and reverse impact resistance of the coatings is given in Table II. The effect of catalyst choice on XW accelerated weathering resistance is given in Table III. The catalyst with the best results as defined by initial gloss and DOI as well as highest retention of gloss after 1000 hours XW is Nacure 2500X. Thus, the formulations referred to in subsequent experiments are best compared to controls using Nacure 2500X as the catalyst.

TABLE I

| CONTROL A: AT-400 FORMULATIONS AT 65% SOLIDS | | | |
|---|---|---|---|
| | Wt % Solids | Solids Equiv. Wt (g/eq) | Actual Weight (g) |
| AT-400 | 75 | 650 | 106.98 |
| TiO2 | | | 87.63 |
| Methyl amyl ketone (MAK) | | | 13.50 |
| CELLOSOLVE Acetate | | | 7.11 |
| Cymel 303 | 98 | 160 | 27.42 |
| n-Butanol | | | 25.26 |
| MAK/CELLOSOLVE Acetate | (85/15) | | 31.68 |
| Dow #3 | | | 0.42 |
| Catalyst | | | * |

*1% 1.07 g
2% 2.14 g
3% 3.21 g
Pigment:binder 45:55
AT-400:Cymel 303 equiv. ratio 1:1.36

TABLE II

| EFFECT OF CATALYSTS ON AT-400 CONTROLS (65% SOLIDS) | | | | | | | | | | |
|---|---|---|---|---|---|---|---|---|---|---|
| | | 250° F. Cure | | | | Impact | 300° F. Cure | | | Impact |
| | Weight | Gloss | | | Pencil | (F/R, | Gloss | | | Pencil | (F/R, |
| | %* | 60° | 20° | DOI | Hardness | in-lb) | 60° | 20° | DOI | Hardness | in-lb) |
| Unblocked | | | | | | | | | | | |
| Nacure 155 | 1 | 88 | 64 | 70 | F | 25/<5 | 86 | 56 | 60 | H | 15/<5 |
| Nacure 1051 | 1 | 89 | 64 | 70 | F | 20/<5 | 86 | 57 | 60 | H | 15/<5 |
| Blocked | | | | | | | | | | | |
| Nacure X49-110 | 2 | 89 | 66 | 70 | F | 20/<5 | 90 | 67 | 80 | HB | 25/<5 |
| Nacure 2500X | 2 | 93 | 74 | 80 | F | 25/<5 | 89 | 64 | 70 | 2H | 25/<5 |
| Nacure 3525 | 2 | 90 | 70 | 80 | HB | 45/15 | 88 | 67 | 70 | HB | 25/<5 |
| Nacure 5225 | 2 | 90 | 71 | 80 | HB | 25/<5 | 89 | 64 | 70 | H | 15/<5 |

*Based on total binder solids
30 min bake
Cymel 303, 1.36 equiv.

TABLE III

| EFFECT OF CATALYST ON PERFORMANCE OF AT-400 (65% SOLIDS) | | | | | |
|---|---|---|---|---|---|
| | | 1000 hr XW | | | |
| | | 250° F. Cure Gloss (before/after) | | 300° F. Cure Gloss (before/after) | |
| Catalyst | Weight %* | 60° | 20° | 60° | 20° |
| Unblocked | | | | | |
| Nacure 155 | 1 | 88/76 (86%) | 52/46 (88%) | 86/74 (86%) | 46/38 (83%) |
| Nacure 1051 | 1 | 86/79 (92%) | 56/50 (89%) | 86/74 (86%) | 45/37 (82%) |
| Blocked | | | | | |
| Nacure X49-110 | 2 | 83/83 (100%) | 56/43 (77%) | 84/80 (95%) | 56/39 (70%) |
| Nacure 2500X | 2 | 92/86 (93%) | 74/50 (68%) | 89/79 (89%) | 59/43 (73%) |
| Nacure 3525 | 2 | 87/76 (87%) | 68/33 (49%) | 87/79 (91%) | 54/34 (63%) |
| Nacure 5225 | 2 | 90/80 (92%) | 70/43 (61%) | 88/75 (85%) | 59/39 (66%) |

Cross-linker: Cymel 303, 1.36 equiv.
*Based on total binder solids.

EXAMPLE II

Control B

This formulation was made for comparison with an identical test formulation containing Polyol I as an additional component. The paint is based on AT-400 and Reactive Oligomer in which the solids weight ratio of these two components is 70:30. The formulation is given in Table IV for a 70 weight % solids paint, although higher solids formulations are possible.

As in Control A, a variety of acid catalysts were used to accelerate the crosslinking reaction. The effect of the catalysts on initial gloss, DOI and hardness is given in Table V for a 70 weight % solids formulation. Nacure 2500X gives the most favorable results for the properties listed above. These results are equivalent to those shown in Table II for the AT-400 control at 65 weight % solids.

III) and AT-400 plus Reactive Oligomer I at 70% solids.

TABLE IV

AT-400 FORMULATIONS WITH REACTIVE OLIGOMERS AT 70% SOLIDS

| | Wt % Solids | Solids Equiv. (g/eq) | Actual Weight (g) Control B (Reactive Oligomer I) | Actual Weight (g) Control C (Reactive Oligomer II) |
|---|---|---|---|---|
| DISPERSION | | | | |
| AT-400 | 75 | 650 | 60.00 | 60.00 |
| Reactive Oligomer I | 100 | 1,169 | 19.29 | — |
| Reactive Oligomer II | 100 | 2,004 | — | 19.29 |
| TiO$_2$ | — | — | 67.87 | 66.64 |
| Methylamyl ketone (MAK) | — | — | 16.69 | 16.39 |
| CELLOSOLVE Acetate | — | — | 5.59 | 5.54 |
| Let Down | | | | |
| Cymel 303 | 98 | 160 | 19.04 | 17.51 |
| n-Butanol | — | — | 1.78 | 1.75 |
| MAK/CELLOSOLVE Acetate (85/15) | — | — | 25.75[1] | 23.39[2] |
| Dow #3 | 25 | — | 1.78 | 1.63 |
| Catalyst | 10 | — | 0.30 | 0.33 |

AT-400:reactive Oligomer (70:30).
Resin OH:cross-linker equiv. ratio = 1:1.36.
Pigment:binder 2% total resin solids.

| 1. | Solids | Wt. Solvents | 2. | Solids | Wt. Solvent |
|---|---|---|---|---|---|
| | 75% | 11.35 | | 75% | 9.25 |
| | 77.5% | 54.51 | | 77.5% | 2.86 |

TABLE V

EFFECT OF CATALYSTS ON APPEARANCE OF AT-400 + REACTIVE OLIGOMER I (70% SOLIDS)

| | Weight % | 250° F. Cure Gloss 60° | 250° F. Cure Gloss 20° | 250° F. Cure DOI | 250° F. Cure Pencil Hardness | 300° F. Cure Gloss 60° | 300° F. Cure Gloss 20° | 300° F. Cure DOI | 300° F. Cure Pencil Hardness |
|---|---|---|---|---|---|---|---|---|---|
| Unblocked | | | | | | | | | |
| Nacure 155 | 1 | 89 | 70 | 70 | HB | 86 | 59 | 60 | H |
| Nacure 1051 | 1 | 93 | 73 | 70 | F | 86 | 53 | 75 | H |
| Blocked | | | | | | | | | |
| Nacure X49-110 | 2 | 88 | 71 | 80 | B | 84 | 55 | 60 | F |
| Nacure 2500X | 2 | 93 | 79 | 80 | HB | 90 | 70 | 70 | H |
| Nacure 3525 | 2 | 88 | 70 | 80 | 2B | 85 | 58 | 60 | H |
| Nacure 5225 | 2 | 90 | 74 | 80 | B | 88 | 64 | 60 | H |

All Cleveland humidity: 8F or better.
All MEK: 200+.
Cross-linker: Cymel 303, 1.36 equiv.

TABLE VI

EFFECT OF CATALYSTS ON APPEARANCE OF AT-400 + REACTIVE OLIGOMER I (70% SOLIDS)

| Catalyst | Weight % | 250° F. Cure Gloss (before/after) 60° | 250° F. Cure Gloss (before/after) 20° | 300° F. Cure Gloss (before/after) 60° | 300° F. Cure Gloss (before/after) 20° |
|---|---|---|---|---|---|
| Unblocked | | | | | |
| Nacure 155 | 1 | 89/75 (84%) | 69/38 (55%) | 86/73 (85%) | 57/39 (68%) |
| Nacure 1051 | 1 | 86/74 (86%) | 68/38 (56%) | 86/76 (88%) | 54/43 (80%) |
| Blocked | | | | | |
| Nacure X49-110 | 2 | 88/70 (80%) | 54/34 (63%) | 83/65 (78%) | 45/27 (60%) |
| Nacure 2500X | 2 | 91/84 (92%) | 72/52 (72%) | 89/78 (88%) | 67/47 (70%) |
| Nacure 3525 | 2 | 88/70 (80%) | 68/34 (50%) | 87/71 (82%) | 56/34 (61%) |
| Nacure 5225 | 2 | 91/80 (88%) | 68/74 (69%) | 89/78 (88%) | 62/43 (69%) |

Cross-linker: Cymel 303, 1.36 equiv.
Cleveland humidity: 8F or better.
MEK: 200+.

The gloss retention after 1000 hours XW exposure for the coatings made using the Control B formulation are shown in Table VI. The results indicate equivalent gloss retention is observed for AT-400 at 65% solids (Table

EXAMPLE III

This experiment was performed to demonstrate the improvement in properties which is observed when the diluent used is a combination of Polyol I and Reactive Oligomer I rather than Reactive Oligomer I alone. A test paint formulation outlined in Table VII using a 70:20:10 solids weight ratio of AT-400:Reactive Oligomer I:Polyol I was used.

Several catalysts were used for the 70% solids formulation. The effect on gloss, DOI, hardness and impact resistance is shown in Table VIII. Compared to the Control B paint which contained only Reactive Oligomer I as the reactive diluent, there is a one to two grade improvement in pencil hardness (Table V vs. Table VIII). Furthermore, nearly every measurement of gloss increased compared to Control B. In several cases the DOI has improved, also.

solids paint formulations shown in Table VII were used, and the results are shown in Table IX. As the formulated weight % solids is increased using Reactive Oligomer I+Polyol I as a reactive diluent the Brookfield viscosity increases. The viscosity of a 70% formulated paint containing the diluent is approximately equal to that of AT-400 (Control A) at 65% solids. Both the gloss and initial appearance of the coatings is maintained as the formulated weight % solids in increased. Note that an increase over actual Control A solids (63.7%) of approximately 10% can be achieved with little degradation of film appearance (77.5% formulated solids, 74.2% actual).

TABLE VII

FORMULATION I
AT-400 FORMULATIONS WITH BINARY DILUENTS AT 70% SOLIDS

|  | Wt % Solids | Solids Equiv Wt (g/eq) | Weight (g) | |
|---|---|---|---|---|
|  |  |  | With Reactive Oligomer I | With Reactive Oligomer II |
| Pigment Dispersion |  |  |  |  |
| AT-400 | 75 | 650 | 60.0 | 60.0 |
| Reactive Oligomer I | 100 | 1169 | 12.86 | — |
| Reactive Oligomer II | 100 | 2004 | — | 12.86 |
| Polyol I | 100 | 140 | 6.43 | 6.43 |
| $TiO_2$ | — | — | 75.06 | 72.24 |
| Methyl amyl ketone (MAK) | — | — | 18.41 | 18.21 |
| CELLOSOLVE acetate | — | — | 5.90 | 5.86 |
| Let down |  |  |  |  |
| Cymel 303 | 98 | 160 | 28.01 | 26.99 |
| n-Butanol | — | — | 2.69* | 2.66 |
| MAK/CELLOSOLVE acetate (85/15) | — | — | 27.75[1] | 27.27[2] |
| Nacure 2500X | 25 | — | 1.83 | 1.81 |
| Dow #3 | 10 | — | 0.33 | 0.33 |

AT-400:reactive oligomer:PCP-0600 (70:20:10)
Resin OH:crosslinker equiv. ratio = 1:1.36
Pigment:binder 45:55
Catalyst 2% total resin solids

| 1 - | Solids | Wt Solvent | 2 - | Solids | Wt Solvent |
|---|---|---|---|---|---|
|  | 75.0% | 11.82 |  | 75.0% | 14.17 |
|  | 77.5% | 4.63 |  | 77.5% | 7.06 |
|  | 80.0% | 0.0 |  | 80.0% | 0.0 |

*0.58 for 80% solids

TABLE VIII

PROPERTIES OF AT-400: REACTIVE OLIGOMER I: POLYOL I (70:30:10)
(70% SOLIDS)

| Catalyst | Weight % | 250° F. Cure | | | | Impact (F/R, in-lb) | 300° F. Cure | | | | Impact (F/R, in-lb) |
|---|---|---|---|---|---|---|---|---|---|---|---|
|  |  | Gloss | | | Pencil | | Gloss | | | Pencil | |
|  |  | 60° | 20° | DOI | Hardness |  | 60° | 20° | DOI | Hardness |  |
| Unblocked |  |  |  |  |  |  |  |  |  |  |  |
| Nacure 155 | 1 | 85 | 49 | 60 | 2H | 30/5 | 87 | 56 | 70 | 2H | 10/<5 |
| Nacure 1051 | 1 | 92 | 71 | 80 | 2H | 50/10 | 93 | 69 | 70 | 2H | 15/<5 |
| Blocked |  |  |  |  |  |  |  |  |  |  |  |
| Nacure X49-100 | 2 | 91 | 71 | 80 | H | 35/5 | 91 | 65 | 70 | H | 25/<5 |
| Nacure 2500X | 2 | 95 | 76 | 80 | 2H | 25/<5 | 96 | 76 | 70 | 2H | 10/<5 |
| Nacure 3525 | 2 | 93 | 71 | 80 | H | 35/<5 | 91 | 66 | 70 | 2H | 20/<5 |
| Nacure 5225 | 2 | 95 | 77 | 80 | H | 25/5 | 93 | 72 | 70 | 2H | 15/<5 |

Cymel 303, 1.35 equiv.
30 min bake
200+ MEK rubs
Cleveland Humidity 8F or better

EXAMPLE IV

The purpose of this experiment was to determine the effect of increased formulated solids using the reactive diluent Reactive Oligomer I+Polyol I (2:1 ratio on a solids basis) on the properties of AT-400 paints including actual weight % solids and viscosity. The higher The gloss retention after 1000 hour XW exposure of the coatings applied at 77.5% solids is given in Table X for Nacure 2500X. The retention of gloss is significantly greater than that of Control B (Table VI) in which Reactive Oligomer I alone is the reactive diluent.

TABLE IX

EFFECT OF INCREASED SOLIDS ON PROPERTIES OF AT-400: REACTIVE OLIGOMER I: POLYOL I (70:20:10)

| Formulated Solids % | Actual Solids % | Viscosity Brookfield (cps) | Ford #4 (sec) | 250° F. Cure Gloss 60° | 20° | DOI | Pencil Hardness | 300° F. Cure Gloss 60° | 20° | DOI | Pencil Hardness |
|---|---|---|---|---|---|---|---|---|---|---|---|
| 70 | 65.9 | 83 | 22 | 99 | 81 | 80 | — | 100 | 76 | 70 | — |
| 75 | 71.4 | 174 | 39 | 96 | 77 | 70 | — | 94 | 69 | 70 | — |
| 77.5 | 74.2 | 269 | 57 | 95 | 78 | 80 | 2H | 95 | 71 | 70 | 2H |
| 80 | 77.2 | 406 | 88 | Not sprayable | | | | | | | |
| AT-400 (Control A) | | | | | | | | | | | |
| 65 | 63.7 | 91 | 30 | 93 | 74 | 80 | F | 89 | 64 | 70 | 2H |

Reactive Oligomer I (1169 g/eq)
30 min bake
2% Nacure 2500X
Cymel 303, 1.36 equiv.
200+ MEK
Cleveland Humidity (140° F., 24 hr): 8F or better
[1] ASTM D2369-81

TABLE X

1000 HOUR XW PERFORMANCE OF AT-400 WITH BINARY DILUENTS (NACURE 2500X)

| Reactive Oligomer | Formulated Wt % Solids | 250° F. Cure Gloss (before/after) 60° | 20° | 300° F. Cure Gloss (before/after) 60° | 20° |
|---|---|---|---|---|---|
| Reactive Oligomer I: Polyol I | 77.5 | 94/93 (99%) | 79/64 (81%) | 94/88 (94%) | 67/50 (75%) |
| Reactive Oligomer II: Polyol I | 77.5 | 95/88 (93%) | 78/58 (74%) | 94/88 (94%) | 70/54 (77%) |

Reactive Oligomer I, (1169 g/eq)
Reactive Oligomer II (2004 g/eq)

EXAMPLE V

Control C

This experiment was performed using Reactive Oligomer II as the reactive diluent for comparison to an identical formulation containing both Reactive Oligomer II and Polyol I (2:1). The formulations for Control C are given in Table IV at 70–77.5% solids. Nacure 2500X was the catalyst.

The results for this set of controls are presented in Table XI. The initial appearance, as measured by gloss and DOI, of AT-400 paint modified with the Reactive Oligomer II at 70% formulated solids is superior to that of Control A (AT-400 at 65% solids, Nacure 2500X catalyst) shown in Table II. The retention of gloss after 1000 hours XW exposure is also improved for a 250° F. cure schedule but not at 300° F. (Table XI vs. Table III).

EXAMPLE VI

This experiment was performed to demonstrate the improvement in properties which is observed when the reactive diluent used in an AT-400 paint is a combination of Reactive Oligomer II and Polyol I. The test formulation is shown in Table VII using a 70:20:10 solids weight ratio of AT-400:Reactive Oligomer II:Polyol I. Several catalysts were used for the 70% solids formulation. The effect on gloss, DOI, hardness and impact resistance is shown in Table XII. Comparison of the coatings cured with Nacure 2500X as the catalyst and Control C (Table XI) at 70% solids shows approximately equivalent levels of gloss and DOI. The gloss retention after 1000 hours of XW exposure is given in Table XIII. The gloss retention is very much superior to that of Control C Reactive Oligomer II alone, Table XI at 70% or that of Control A (AT-400, Table III) at 65% solids.

TABLE XI

CONTROL C: FORMULATIONS OF AT-400 AND REACTIVE OLIGOMER IV AT HIGHER SOLIDS (NACURE 2500X)

| | Formulated Wt % Solids | Actual[1] Wt. % Solids | Viscosity Brookfield (cps) | Ford #4 (sec.) | Gloss 60° | 20° | DOI | Pencil Hardness | 1000 Hours XW Gloss (before/after) 60° | 20° |
|---|---|---|---|---|---|---|---|---|---|---|
| 250° F. Cure | 70 | 63.9 | 90 | 25 | 100 | 86 | 80 | F | 95/95 (100%) | 81/59 (73%) |
| | 75 | 69.2 | 202 | 45 | 94 | 78 | 80 | F | 92/79 (86%) | 81/31 (38%) |
| | 77.5 | 71.7 | 309 | 65 | 92 | 74 | 80 | HB | 90/88 (98%) | 76/55 (72%) |
| 300° F. Cure | 70 | — | — | — | 100 | 85 | 70 | H | 100/84 (84%) | 84/35 (42%) |
| | 75 | — | — | — | 97 | 77 | 70 | H | 94/74 (79%) | 80/30 (38%) |
| | 77.5 | — | — | — | 94 | 73 | 70 | H | 93/78 (84%) | 79/41 (52%) |

[1] ASTM D-2369-81.
Reactive Oligomer II (1275 g/eq).

TABLE XII
PROPERTIES OF AT-400: REACTIVE OLIGOMER II: POLYOL I (70:20:10)

| | Brookfield Viscosity | 250° F. Cure | | | | | 300° F. Cure | | | | |
|---|---|---|---|---|---|---|---|---|---|---|---|
| | | Gloss | | | Pencil | Impact (F/R, | Gloss | | | Pencil | Impact (F/R, |
| Catalyst | (cps) | 60° | 20° | DOI | Hardness | in-lb) | 60° | 20° | DOI | Hardness | in-lb) |
| Unblocked - 1% | | | | | | | | | | | |
| Nacure 155 | 66 | 87 | 62 | 70 | H | 35/5 | 84 | 54 | 60 | H | 25/<5 |
| Nacure 1050 | 88 | 96 | 87 | 90 | H | 80/25 | 95 | 74 | 70 | 2H | 15/<5 |
| Blocked - 2% | | | | | | | | | | | |
| Nacure X49-110 | 82 | 91 | 74 | 80 | F | 45/5 | 89 | 67 | 70 | 2H | 20/<5 |
| Nacure 2500X | 81 | 95 | 81 | 80 | F | 30/<5 | 95 | 74 | 70 | 2H | 10/<5 |
| Nacure 3525 | 82 | 93 | 75 | 80 | HB | 45/10 | 89 | 76 | 70 | F | 30/<5 |
| Nacure 5225 | 81 | 96 | 82 | 90 | 2B | 60/15 | 94 | 71 | 70 | 2H | 15/<5 |

Reactive Oligomer II (2004 g/eq)
Cymel 303, 1.36 equiv.
30 min bake
300+ MEK
Cleveland Humidity 8F or better

TABLE XIII
AT-400: Reactive Oligomer II: POLYOL I BINARY DILUENT (70:20:10)

| | | 1000 hr XW | | | |
|---|---|---|---|---|---|
| | | 250° F. Cure Gloss (before/after) | | 300° F. Cure Gloss (before/after) | |
| Catalyst | Weight %* | 60° | 20° | 60° | 20° |
| Unblocked | | | | | |
| Nacure 155 | 1 | 90/86 (96%) | 73/63 (86%) | 89/85 (96%) | 64/57 (89%) |
| Nacure 1051 | 1 | 94/91 (97%) | 84/71 (85%) | 93/90 (97%) | 73/67 (92%) |
| Blocked | | | | | |
| Nacure 2500X | 2 | 95/94 (99%) | 85/77 (91%) | 93/90 (97%) | 78/69 (89%) |
| Nacure 3525 | 2 | 92/89 (97%) | 81/69 (85%) | 88/85 (97%) | 70/62 (89%) |
| Nacure 5225 | 2 | 94/91 (97%) | 90/73 (81%) | 93/89 (96%) | 73/67 (92%) |
| Nacure X49-110 | 2 | 92/89 (97%) | 78/70 (90%) | 91/88 (97%) | 74/68 (92%) |

*Based on total binder solids

EXAMPLE VII

The purpose of this experiment was to determine the effect of increased formulated solids using the reactive diluent Reactive Oligomer II and Polyol I (2:1) on the properties of AT-400 paints including actual weight % and viscosity. The higher solids paint formulations shown in Table VII were used, and the results are given in Table XIV.

Compared to AT-400 Control A at 65% formulated solids, the Brookfield viscosity of a 70% formulated solids paint containing Reactive Oligomer II and Polyol I (2:1) is equivalent (85 vs 91 cps). Thus, formulation at 5% higher solids gives equal viscosity compared to Control A when the diluent is used. Formulation at 77.5% solids gives a paint with actual solids of 72.6%, a 9% increase over the actual solids of Control A. This is also 1% higher than the actual solids found in Control C (Reactive Oligomer II alone as the diluent) in Table XI.

There is an increase in the hardness of the coatings of this experiment compared to those of Control C. Gloss is maintained but DOI is slightly lower, however.

The effect of Reactive Oligomer II and Polyol I on the gloss retention after 1000 hours XW is given in Table X. Compared to the gloss retention of either Reactive Oligomer II alone as the diluent (Control C, Table XI) at 77.5% solids or AT-400 at 65% solids (Control A, Table III) there is a significant improvement in the 20° gloss retention of the coating.

TABLE XIV
EFFECT OF INCREASED SOLIDS ON PROPERTIES OF AT-400: REACTIVE OLIGOMER II: POLYOL I (70:20:10)

| | | Viscosity | | 250° F. Cure | | | | 300° F. Cure | | | |
|---|---|---|---|---|---|---|---|---|---|---|---|
| Formulated Solids % | Actual[1] Solids % | Brookfield (cps) | Ford #4 (sec) | Gloss 60° | 20° | DOI | Pencil Hardness | Gloss 60° | 20° | DOI | Pencil Hardness |
| 70 | 65.6 | 85 | 22 | 100 | 81 | 70 | — | 100 | 80 | 60 | — |
| 75 | 69.3 | 148 | 35 | 95 | 77 | 70 | — | 95 | 69 | 60 | — |
| 77.5 | 72.6 | 226 | 49 | 97 | 79 | 70 | 2H | 95 | 70 | 60 | 2H |
| 80 | 76.5 | 406 | 86 | Not sprayable | | | | | | | |

Reactive Oligomer II (2004 g/eq)
30 min bake
2% Nacure 2500X
Cymel 303, 1.36 equiv.
200+ MEK
Cleveland Humidity (140° F., 24 hr): 8F or better
[1]ASTM D2369-81

EXAMPLE VIII

This experiment was performed to demonstrate that using a binary diluent combination $HEA_xEA_y$ + Polyol I (2:1) gives a higher level of actual weight % solids to a paint formulation than does $HEA_xEA_y$ alone. A series of AT-400 based paints were made at increasing levels of weight % solids following the formulations given in Table I (AT-400 only), Table IV ($HEA_xEA_y$ diluent), and Table VII ($HEA_xEA_y$:Polyol I (2:1) diluent). Typical examples of formulated vs actual solids are shown in Table XV. It can be seen that a 5% increase in formulation solids from 65% to 70% does not give a similar 5% increase in actual solids. The actual gain in solids is much less. For example, increasing formulated solids from 65% to 70% by addition of Reactive Oligomer II to AT-400 results in a change in weight percent solids from 63.7 to 65.6%.

Part of this loss can be attributed to the reactive diluent. At curing temperatures there are two possible paths which the reactive diluent can follow. It can react with the cross-linker via one of its hydroxyl groups or it may simply volatilize. The relative rates of the two pathways are determined by the molecular weight of the reactive diluent, its degree of functionality, the concentration of the reacting components in the paint formulation and the nature of both the catalyst and cross-linker used. The remaining portion of the loss arises from methanol produced during the cross-linking reaction and process solvent remaining from the reactive diluent, typically 5–7%.

It is possible to estimate an approximate upper limit for actual solids based on the amount of methanol loss due to the reaction of Cymel 303 in our system. If pigmented AT-400 is formulated with 1.36 equivalents of Cymel 303 at 70% solids, and all of the cross-linker reacts (either with AT-400 or itself), then the maximum solids which can be attained is 68.0%. If we formulate a 70:30 mixture of AT-400 and Reactive Oligomer I (1169 g/eq OH in this experiment) with Cymel 303 at 70% solids, then methanol loss gives a calculated maximum weight solids of 68.2%. Similar estimates for other formulated solids levels give the range of maximum weight solids listed in Table XV. Calculated values for Reactive Oligomer II (2004 g/eq OH) are also given.

If it is assumed that the estimated maximum weight %'s listed in Table XV account for loss of solids due to methanol volatilization, then any difference between these numbers and the actual solids found can be attributed to Reactive Oligomer volatilization or loss of process solvent. This reactive oligomer loss of 1.1% is estimated for Reactive Oligomer II:AT-400 formulated at 77.5% solids (1.1=75.7−74.6).

As the formulated solids of a paint is increased, the reactive oligomer volatilization decreases.

In terms of percent of loss of the initial reactive oligomer in an AT-400 paint formulated at 70–75.5% solids the loss of Reactive Oligomer I+Polyol I is 9–22% while that of the Control B is 15–26%. Similarly, for Reactive Oligomer II+Polyol I the loss of oligomer ranges from 10–19% when Cycat 500 is the catalyst, while the loss from Control C is 15–31%.

TABLE XV

ESTIMATION OF SOLIDS LOSS FROM REACTIVE OLIGOMER VOLATILIZATION (CYCAT 500, 1%)

|  | Formulated Wt % Solids | Estimated Max. Wt % Solids | Actual[1] Wt % Solids | Reactive[2] Oligomer Loss | % Reactive Oligomer in Formulation | % Reactive Oligomer Lost |
|---|---|---|---|---|---|---|
| AT-400 | 72.5 | 70.5 | 71.5 | (1.0) | — | — |
| CONTROL A | 70 | 68.0 | 68.6 | (0.6) | — | — |
|  | 65 | 63.2 | 63.7 | (0.5) | — | — |
| Reactive Oligomer I | 77.5 | 75.5 | 74.0 | 1.5 | 9.9 | 15 |
| CONTROL B | 75 | 73.1 | 71.5 | 1.6 | 9.6 | 17 |
|  | 72.5 | 70.7 | 68.6 | 2.1 | 9.2 | 23 |
|  | 70 | 68.2 | 65.9 | 2.3 | 8.9 | 26 |
| Reactive Oligomer I + | 80 | 77.4 | 77.2 | 0.2 | 9.2 | 2 |
| Polyol I | 77.5 | 75 | 74.2 | 0.8 | 8.9 | 9 |
|  | 75 | 72.5 | 71.4 | 1.1 | 8.6 | 13 |
|  | 70 | 67.7 | 65.9 | 1.8 | 8.1 | 22 |
| Reactive Oligomer II | 77.5 | 75.7 | 74.6 | 1.1 | 10.1 | 11 |
| CONTROL C | 75 | 73.2 | 71.7 | 1.5 | 9.7 | 15 |
|  | 72.5 | 70.1 | 68.0 | 2.1 | 9.4 | 22 |
|  | 70 | 68.4 | 65.6 | 2.8 | 9.1 | 31 |
| Reactive Oligomer II + | 80 | 77.4 | 76.5 | 0.9 | 9.3 | 10 |
| Polyol I[3] | 77.5 | 75 | 72.6 | 2.4 | 9.0 | 27 (10)* |
|  | 75 | 72.6 | 69.3 | 3.3 | 8.7 | 38 (16)* |
|  | 70 | 67.8 | 65.6 | 2.2 | 8.2 | 27 (13)* |

[1]ASTM D2369-81
[2]Estimated max. - actual solids
[3]data shown are for Nacure 2500x, 2%
*Catalyst: 1% Cycat 500
Reactive Oligomer I (1169 g/eq)
Reactive Oligomer II (2004 g/eq)
Polyol I (140 g/eq)

We claim:

1. Improved high solids coating compositions containing an hydroxy functional acrylic copolymer base resin and having higher total solids content and when cured, with enhanced weathering resistance and hardness, where the improvement comprises replacing part of the acrylic base resin with a binary reactive diluent comprising:

(1) a reactive acrylic oligomer having the formula $X_aY_b$ wherein X is an hydroxyalkyl acrylate or methacrylate, Y is an alkylacrylate or methacrylate, each of the alkyl groups having about 1 to 6 carbon atoms and each of "a" and "b" having values of about 4 to about 14; and (2) a polycaprolactone hexol wherein the weight ratio of oligomer (1) to polycaprolactone hexol (2) is in the range of about 1:1 to about 4:1 and the weight ratio of reactive acrylic oligomer plus polycaprolactone hexol to acrylic base resin is in the range of about 1:1 to about 1:9.

2. Composition claimed in claim 1 wherein the weight ratio of oligomer (1) to polycaprolactone hexol is about 1.5:1 to about 2.5:1.

3. Composition claimed in claim 1 wherein the combined weight ratio of oligomer (1) plus polycaprolactone hexol to acrylic base resin is in the range of about 40:60 to about 20:80.

4. Composition claimed in claim 1 wherein the polycaprolactone hexol is the reaction product of a polycaprolactone triol and a cycloaliphatic epoxide containing two or more epoxy groups per molecule.

5. Composition claimed in claim 4 wherein the polycaprolactone triol has an average molecular weight of 300 and an average hydroxyl number of 560 and the cycloaliphatic epoxide is 3,4-epoxycyclohexylmethyl-3,4-epoxycyclohexane carboxylate.

6. Composition claimed in claim 5 wherein the resulting polycaprolactone hexol has a number average molecular weight of 800 and an hydroxyl number of 312.

7. Composition claimed in claim 1 wherein X in the formula $X_aY_b$ is hydroxyethyl acrylate and Y is ethyl acrylate.

8. Composition claimed in claim 7 wherein the average value of "a" is 7 and the average value of "b" is 14.

9. Composition claimed in claim 7 wherein the average value of "a" is 5 and the average value of "b" is 10.

10. Composition claimed in claim 1 wherein the composition is cured with a methylolated melamine.

11. Composition claimed in claim 10 wherein the methylolated melamine is hexamethoxymethyl melamine.

12. Process for preparing a cured coating of the composition claimed in claim 1 which comprises baking said composition for at least 30 minutes at a temperature of about 100° C. to about 375° C.

13. The cured coating composition of claim 12.

14. An article coated with the cured composition of claim 13.

* * * * *